United States Patent [19]

Juso et al.

[11] Patent Number: 4,869,566
[45] Date of Patent: Sep. 26, 1989

[54] OPTICAL FIBER AND ELECTRICAL PLUG/JACK INTERCONNECTION DEVICE

[75] Inventors: Hiromi Juso, Gose; Shuzo Nishida, Hiroshima; Keizo Okuno, Hiroshima; Hidenori Minoda, Hiroshima, all of Japan

[73] Assignee: Sharp Kabushiki Kaisha, Osaka, Japan

[21] Appl. No.: 313,314

[22] Filed: Feb. 17, 1989

Related U.S. Application Data

[63] Continuation of Ser. No. 55,234, May 28, 1987, abandoned.

[30] Foreign Application Priority Data

May 28, 1986 [JP] Japan .................................. 61-80793
May 30, 1986 [JP] Japan .................................. 61-81909

[51] Int. Cl.$^4$ ............................. G02B 6/36; H01J 5/16
[52] U.S. Cl. ............................. 350/96.20; 350/96.10; 350/96.22; 250/227; 439/577; 439/608; 439/610
[58] Field of Search .............. 350/96.20, 96.21, 96.10, 350/96.22; 250/227; 439/577, 608, 610, 668, 669

[56] References Cited

U.S. PATENT DOCUMENTS

| | | | |
|---|---|---|---|
| 4,081,208 | 3/1978 | Meade | 350/96.20 |
| 4,187,481 | 2/1980 | Boutros | 439/608 X |
| 4,432,604 | 2/1984 | Schwab | 350/96.21 |
| 4,465,333 | 8/1984 | Caserta et al. | 350/96.20 |
| 4,707,045 | 11/1987 | Ney et al. | 439/608 X |
| 4,767,181 | 8/1988 | McEowen | 350/96.21 |
| 4,779,948 | 10/1988 | Wais et al. | 350/96.20 |
| 4,781,429 | 11/1988 | Cartier | 350/96.20 |
| 4,786,257 | 11/1988 | Tengler | 439/610 X |
| 4,787,699 | 11/1988 | Moulin | 350/96.21 |

FOREIGN PATENT DOCUMENTS

| | | | |
|---|---|---|---|
| 0142970 | 5/1985 | European Pat. Off. | 350/96.20 |
| 57-198419 | 12/1982 | Japan | 350/96.20 |
| 60-188912 | 9/1985 | Japan | 350/96.20 |
| 2110410 | 6/1983 | United Kingdom | 350/96.20 |
| 2120467 | 11/1983 | United Kingdom | 439/610 X |

Primary Examiner—William L. Sikes
Assistant Examiner—Brian M. Healy
Attorney, Agent, or Firm—Flehr, Hohbach, Test, Albritton & Herbert

[57] ABSTRACT

A connector with a plug having a protruding piece and a jack for accepting it can transmit not only electrical signals but also light signals between devices connected thereby. Optical fibers for transmitting light signals therethrough are placed longitudinally inside the protruding piece of the plug and the jack includes not only electrodes for transmitting electrical signals but also a light emitting element to transmit light signals into the plug through the optical fibers or a light receiving element for receiving light signals transmitted through the optical fibers.

17 Claims, 2 Drawing Sheets

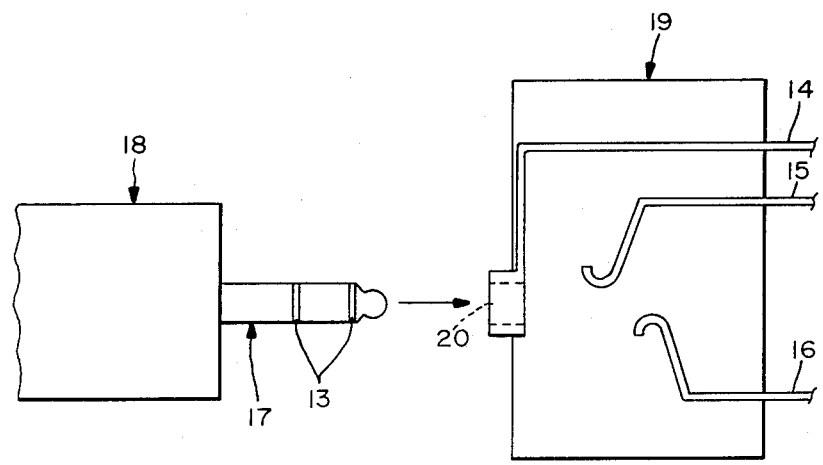
(PRIOR ART)
FIG.—1
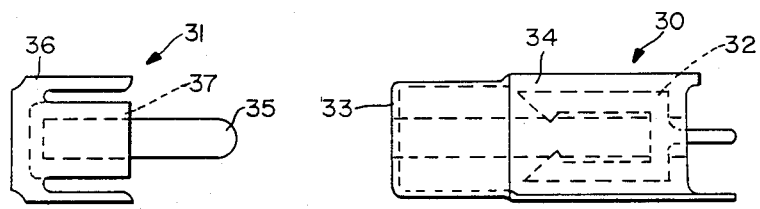
(PRIOR ART)
FIG.—2
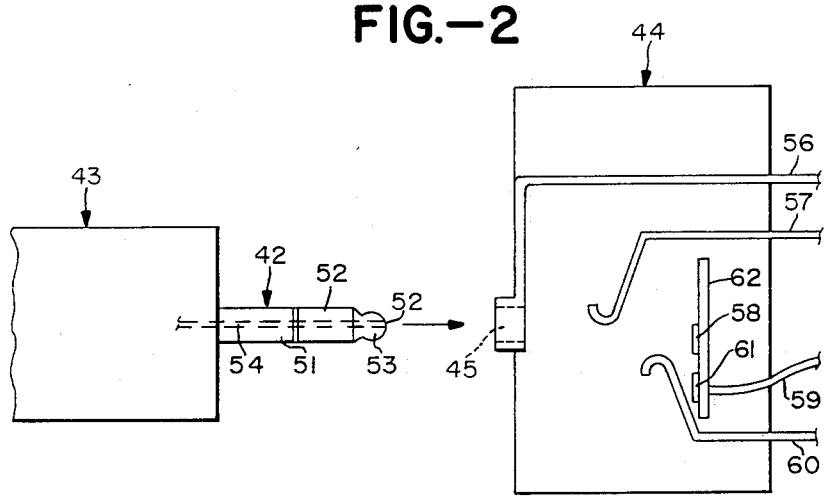
FIG.—3

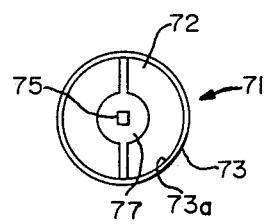
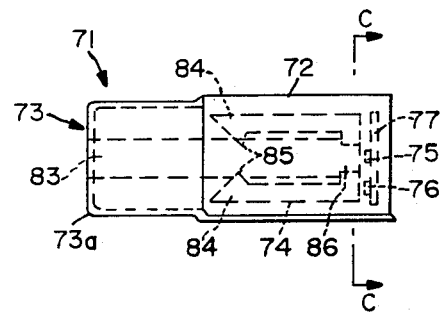
FIG.—4A  FIG.—4B
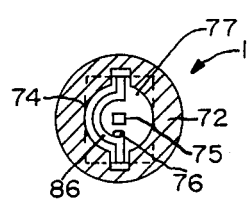
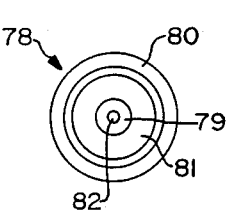
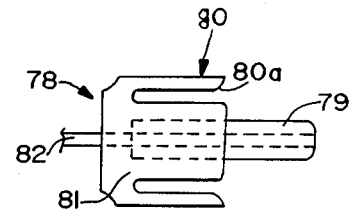
FIG.—4C  FIG.—5A  FIG.—5B
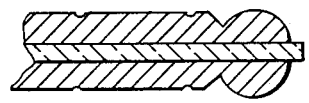
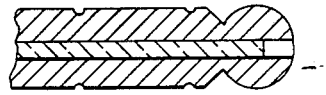
FIG.—6A  FIG.—6B
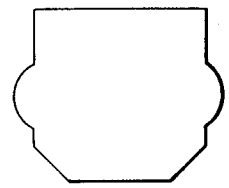
FIG.—7

OPTICAL FIBER AND ELECTRICAL PLUG/JACK INTERCONNECTION DEVICE

This a continuation of Application Ser. No. 055,234 filed May 28, 1987, now abandoned.

BACKGROUND OF THE INVENTION

This invention relates to a connector between acoustical apparatus such as between a headphone and an audio playback device and more particularly to such a connector which can also transmit light signals through optical fibers.

Prior art connectors for acoustical apparatus are adapted to exchange only a relatively few signals. If it is desired to exchange a large number of signals, many connectors must be utilized and wiring between apparatus becomes inconveniently complicated. FIG. 1 shows an example of prior art connector comprising a plug 18 and a jack 19. The plug 18 has a frontally protruding elongated piece 17 divided longitudinally into three conductor parts mutually separated by insulator pieces 13 such that connection can be established with a plurality of electrical units. The jack 19 is comprised of a shielding conductor 14, an L-channel conductor 15 and an R-channel conductor 16. Acoustical apparatus each having the plug 18 and the jack 19 become connected when the protruding piece 17 of the plug 18 is inserted into the jack 19 through its opening 20 such that the first, second and third conductors respectively contact the shielding conductor 14, the L-channel conductor 15 and the R-channel conductor 16.

FIG. 2 shows another example of prior art connector comprising an RCA type pin jack 30 and pin plug 31. The pin jack 30 includes a central conductor 32, a grounded outer cover 33 and an insulator 34 disposed therebetween to electrically insulate them. Correspondingly, the pin plug 31 includes a frontally protruding central pin 35, a grounded outer cover 36 and an insulator 37 disposed therebetween to electrically insulate them such that connection can be established by inserting the pin plug 31 into the pin jacket 30, thereby elastically compressing the central conductor 32 of the jack 30 against the central pin 35 and the outer covers 33 and 36 against each other. With a connector of this structure, however, data for only one electrical apparatus can be transmitted.

SUMMARY OF THE INVENTION

It is therefore an object of the present invention to provide a connector of simple structure which can transmit a large number of data.

It is another object of the present invention to provide a connector which can transmit a large number of data efficiently, serving as a connector both for light signals and for electrical signals.

The above and other objects of the present invention are achieved by providing a connector for one or more electrical systems, having a male part and a corresponding female part, with the male part exposing at its front end an end section of optical fibers and the female part containing an optical element on the optical axis of light signals which are transmitted or received through the exposed end section of the optical fibers such that light signals can be additionally communicated through the connector.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a side view of a prior art connector,

FIG. 2 is a side view of another prior art connector,

FIG. 3 is a side view schematically showing the structure of a connector embodying the present invention, FIGS. 4A, 4B and 4C are views of a male part of another connector embodying the present invention, FIG. 4A being its front view, FIG. 4B being its side view and FIG. 4C being its sectional view taken along the line C—C of FIG. 4B, FIGS. 5A and 5B are views of a female part of the connector of FIGS. 4A, 4B and 4C, FIG. 5A being its front view and FIG. 5B being its side view, FIGS. 6A and 6B are sectional side views of the front ends of plugs, and FIG. 7 shows a cross-sectional shape of a plug.

DETAILED DESCRIPTION OF THE INVENTION

FIG. 3 shows a connector according to one embodiment of the present invention, comprising a plug 43 and a jack 44. The plug 43 has on its front surface an elongated protruding piece 42 with a first conductor 51, a second conductor 52 and a third conductor 53 mutually insulated from one another such that two electrical units can be connected. Inside the plug 43, optical fibers 54 are longitudinally disposed through the interior of the elongated protruding piece 42 along its central axis with their front end 55 exposed at the front end of the protruding piece 42. The jack 44 includes an opening 45 through which the elongated protruding piece 42 of the plug 43 can be inserted to fit tightly inside, a shielding conductor 56 adapted to contact the first conductor 51 of the plug 43, an L-channel conductor 57 adapted to contact the second conductor 52 and an R-channel conductor 60 adapted to contact the third conductor 53. Additionally, there is provided inside the jack 44 a supporting plate 62 on which is affixed an optical element 58 opposite to the position of the front end 55 of the optical fibers 54 when the plug 43 is fully inserted into the jack 44 through the opening 45, that is, on the optical axis of light signals transmitted through the front end 55 of the optical fibers 54. Numeral 61 indicates a circuit element connected to the optical element 58 and disposed proximally thereto. The optical element 58 may be a light-receiving element if the jack 44 is attached to a signal receiving device, and may be a light emitting element such as LED if the jack 44 is on the side of a signal transmitting device. The circuit element 61 may include an amplifier and a comparator if the optical element 58 is a light-receiving element, and a driver IC if the optical element 58 is a light emitting element. Numeral 59 indicates a lead line for input or output of electrical signals.

When two acoustical devices (say, a first device and a second device) are connected by a connector of the type described above, the plug 43 is connected to the first device through a cable or the like and the jack 44 is affixed to the second device. The cable contains within itself a shield line connected to the first conductor 51 of the plug 43, a signal line connected to the second conductor 52, another signal line connected to the third conductor 53 and the optical fibers 14. When the elongated piece 42 of the plug 43 is inserted into the jack 44 through the opening 45, the first conductor 51 of the plug 43 comes into contact with the shielding conductor 56 of the jack 44, the second conductor 52 with the L-channel conductor 57, and the third conductor 53 with the R-channel conductor 60, thereby establishing an electrical connection between the two acoustical devices.

In the situation where the jack 44 is on the side of receiving light signals, the optical element 58 is a light-receiving element and a light signal passing through the optical fibers 54 of the plug 43 is transmitted from the front end 55 and is received by the light-receiving element. This light signal is transformed into an electrical signal, amplified by the amplifier in the circuit 61, converted into a logic level signal by the comparator IC, and thereafter taken through the lead line 59 into the second acoustical device.

In the situation where a light signal is transmitted from the jack 44, the optical element 58 is a light-emitting element and an electric signal transmitted from the second acoustical device is received by the driver IC in the circuit 61 through the lead line 59. The driver IC serves to drive the light-emitting element according to the received electrical signal to transmit a light signal from the light-emitting element. The light signal thus emitted is received by the optical fibers 54 of the plug 43 through the front end 55, transmitted through the optical fibers 54 into the first acoustical device and processed therein.

Since the outer layer of the jack 44 is a conductor serving as a shielding plate, stability of the IC containing a high-gain amplifier can be improved. Moreover, the connector of the present invention described above can connect acoustical devices simultaneously both by electrical and light signals. Accordingly, connection of devices becomes simplified and generation of noise caused by grounding of many electrical signal lines can be eliminated.

FIGS. 4A, 4B and 4C and FIGS. 5A and 5B show a connector of another type embodying the present invention, comprised of a pin jack 71 and a pin plug 78. With reference to FIGS. 4A, 4B and 4C, the pin jack 71, which serves as the female part of the connector, includes an insulator 72 which not only constitutes its main body but also serves to separate and electrically insulate other components, a conductive outer cover 73 around the jack 71 in front of the insulator 72, a central conductor 74 disposed inside the insulator 72 and a supporting plate 77 which is disposed at the back end of the insulator 72 and on which are affixed an optical element 75 and a circuit element 76. With reference next to FIGS. 5A and 5B, the pin plug 78, which serves as the male part of the connector, includes a central pin 79 which serves as a contact piece and is disposed at the center, a conductive outer cover 80, an insulator 81 disposed between the central pin 79 and the outer cover 80 to insulate them from each other, and optical fibers 82 with an end section disposed inside the central pin 79. The pin plug 78 is adapted to be engagingly inserted into the pin jack 71 so as to establish a connection capable of transmitting signals therethrough. The optical element 75 is affixed at the center of the supporting plate 77 of the pin jack 71 so as to be opposite to the end surface of the optical fibers 82 and that the central optical axis at the end surface of the optical fibers 82 will pass through the light-receiving or light-emitting center of the optical element 75 when the pin plug 78 is fully (engagingly) inserted into the pin jack 71.

When a connector with the structure described above is used on an apparatus adapted to transmit light signals, a light-emitting element such as an LED for converting electrical signals into light signals is used as the optical element 75 and the circuit element 76 disposed proximally thereto may include a driver IC for driving this light-emitting element. When the connector is used on an apparatus adapted to receive light signals, on the other hand, a light-receiving element such as a phototransistor for converting light signals into electrical signals is used as the optical element 75 and the circuit element 76 may include an amplifier-comparator IC for amplifying electrical signals and generating logic level signals.

FIG. 4B further shows a longitudinal tunnel-like central hole 83 formed inside the jack insulator 72 from the front end (where the outer cover 73 is disposed) half way towards the back. This hole 83 is of the shape and size such that the central pin 79 of the pin plug 78 can securely engage therein. The central conductor 74 of the jack 71 adapted to contact the central pin 79 has guide pieces 84 in an angled U-shape formed at its front end. Contact protrusions 85 toward the center are formed on the inner surfaces of the guide pieces 84 such that the central pin 79, when it penetrates through the hole 83, elastically presses these protrusions in outward directions, thereby establishing a firm contact between the central pin 79 of the plug 78 and the central conductor 74 of the jack 71. In addition, the central conductor 74 is formed with a semi-circular section 86 so as not to interfere with the light signals transmitted between the optical element 75 disposed at the center of the supporting plate 77 and the end surface of the optical fibers 82. The outer cover 73 of the jack 71 is not only made slightly larger than the outer cover 80 of the plug 78 but also provided with a rounded edge section 73a. The outer cover 80 of the plug 78 is also provided with a tapered edge section 80a such that the plug 78 can be smoothly inserted into the jack 71, while the elastic outward deformation of the outer cover 80 of the plug 78 establishes a firm connection therebetween. The end surface of the optical fibers 82 is flush with the front end surface of the central pin 79. Moreover, the central pin 79 is so designed that its front end will not reach or damage the optical element 75 or the circuit element 76 even if it is inserted fully into the central hole 83 through the jack 71.

When a connector structured as described above is used on a light-emitting apparatus with an LED provided as the optical element 75 and a driver IC as the circuit element 76 on the supporting plate 77, and the plug 78 is inserted into the jack 71, firm connections are established between the central conductor 74 of the jack 71 and the central pin 79 of the plug 78 and also between the two outer covers 73 and 80 which are grounded. In addition, the end surface of the optical fibers 82 becomes positioned only a small distance away from the LED driven by the driver IC can be transmitted through the optical fibers 82 to another electronic apparatus or the like. Similarly, when the connector is used on a light-receiving apparatus with a phototransistor or the like disposed as the optical element 75 and an amplifier-comparator IC as the circuit element 76, and the plug 78 is inserted into the jack 71, light signals through the optical fibers 82 are converted into electrical signals by the phototransistor, processed by the amplifier-comparator IC and thereafter outputted. As mentioned above in connection with the connector of FIG. 3, the outer cover 73 of the jack 71 serves as a shielding plate and reduces the noise even if a circuit element including a high-gain amplifier is disposed inside the jack 71.

The foregoing description of preferred embodiments of the invention has been presented for purposes of illustration and description. It is not intended to be exhaustive or to limit the invention to the precise form disclosed, and many modifications and variations are possible in light of the above teaching. For example, the end surface of optical fibers (54 or 82) may protrude from the front end of the plug (42 or 79) as shown in FIG. 6A or be recessed therefrom as shown in FIG. 6B, instead of being flush therewith as described in connection with FIG. 5B. The protruding piece of the plug need not necessarily have a circular cross-sectional shape. Plugs with cross-sectional shapes as shown, for example, in FIG. 7, as well as any modifications and variations that may be apparent to a person skilled in the art, are to be included within the scope of this invention.

What is claimed is:

1. A connector comprising
a plug which includes optical fibers having an end surface defining an optical axis for optical signals emitted or received therethrough, and
a jack having an opening through which said plug is removably insertable into said jack and including a supporting plate,
an optical element supported by said supporting plate at a position on said optical axis and facing said end surface of said optical fibers when said plug is fully inserted into said jack,
circuit elements disposed near and connected to said optical element,
a lead line connected to said circuit elements for inputting or outputting an electrical signal to or form said circuit elements, and
a shielding conductor member for reducing noise disposed near said supporting plate, said circuit elements and said lead line, said conductor member being adapted to make an electrical contact with said plug when said plug is inserted fully into said jack.

2. The connector of claim 1 wherein said plug has an elongated tubular member with a front end, said optical fibers being disposed inside said tubular member.

3. The connector of claim 2 wherein said end surface is flush with said front end.

4. The connector of claim 2 wherein said end surface protrudes slightly from said front end.

5. The connector of claim 2 wherein said end surface is slightly recessed from said front end.

6. A connector jack for accepting a connector plug having a front end, said connector jack comprising
conductor pieces for electrical contacts,
a supporting plate,
an optical element supported by said supporting plate at a position facing said front end of said connector plug when said connector plug is fully inserted into said connector jack,
means for converting electrical signals into optical signals or optical signals into electrical signals, said converting means disposed on said supporting plate near said optical element and connected thereto,
a lead line connected to said converting means for inputting or outputting electrical signals to or from said converting means, and
a shielding conductor member for reducing noise disposed near said supporting plate, said converting means and said lead line, said conductor member being adapted to make an electrical contact with said connector plug when said connector plug is fully inserted into said jack.

7. The connector jack of claim 6 further comprising an outer cover which is made of a conductive material, said conductive pieces and said converting means being contained inside said outer cover.

8. The connector jack of claim 6 wherein said converting means include an amplifier and a comparator.

9. A connector comprising a plug and a jack, said plug including an elongated protruding piece adapted to be removably inserted into said jack to establish electrical contacts, said protruding piece enveloping optical fibers for transmitting optical signals therethrough, said optical fibers having an end surface defining an optical axis for optical signals emitted or received through said end surface, said jack including a shielding conductor member for reducing noise, a supporting plate, an optical element for receiving light signals transmitted through said optical fibers or for emitting light signals into said optical fibers, said optical element being supported by said supporting plate at a position on said optical axis facing said end surface of said optical fibers when said plug is fully inserted into said jack, said optical element being connected to circuit elements which are disposed near and connected to said optical element, a lead line being connected to said circuit elements, said conductor member being disposed near said supporting plate, said optical elements, said circuit elements and said lead line and adapted to make an electrical contact with said plug when said plug is fully inserted into said jack.

10. The connector of claim 9 wherein said jack includes means for converting light signals into electrical signals or for converting electrical signals into light signals.

11. The connector of claim 9 wherein said jack further includes conductor pieces for establishing electrical contacts with said plug when said plug is inserted into said jack.

12. The connector of claim 9 wherein said jack further includes a shielding conductor which surrounds said light emitting or receiving means and said signal converting means.

13. The connector of claim 10 wherein said signal converting means include an amplifier.

14. The connector of claim 1 wherein said optical element is a light-receiving element and said circuit elements include an amplifier and a comparator.

15. The connector of claim 14 wherein said light-receiving element is a phototransistor.

16. The connector of claim 1 wherein said optical element is a light-emitting element and said circuit elements include a driver integrated circuit element.

17. The connector of claim 16 wherein said optical element is a light-emitting diode.

* * * * *